Feb. 19, 1924.
C. M. CHAPMAN
1,484,604
AUTOMATIC SCREW MACHINE
Filed Jan. 31, 1921    6 Sheets-Sheet 1
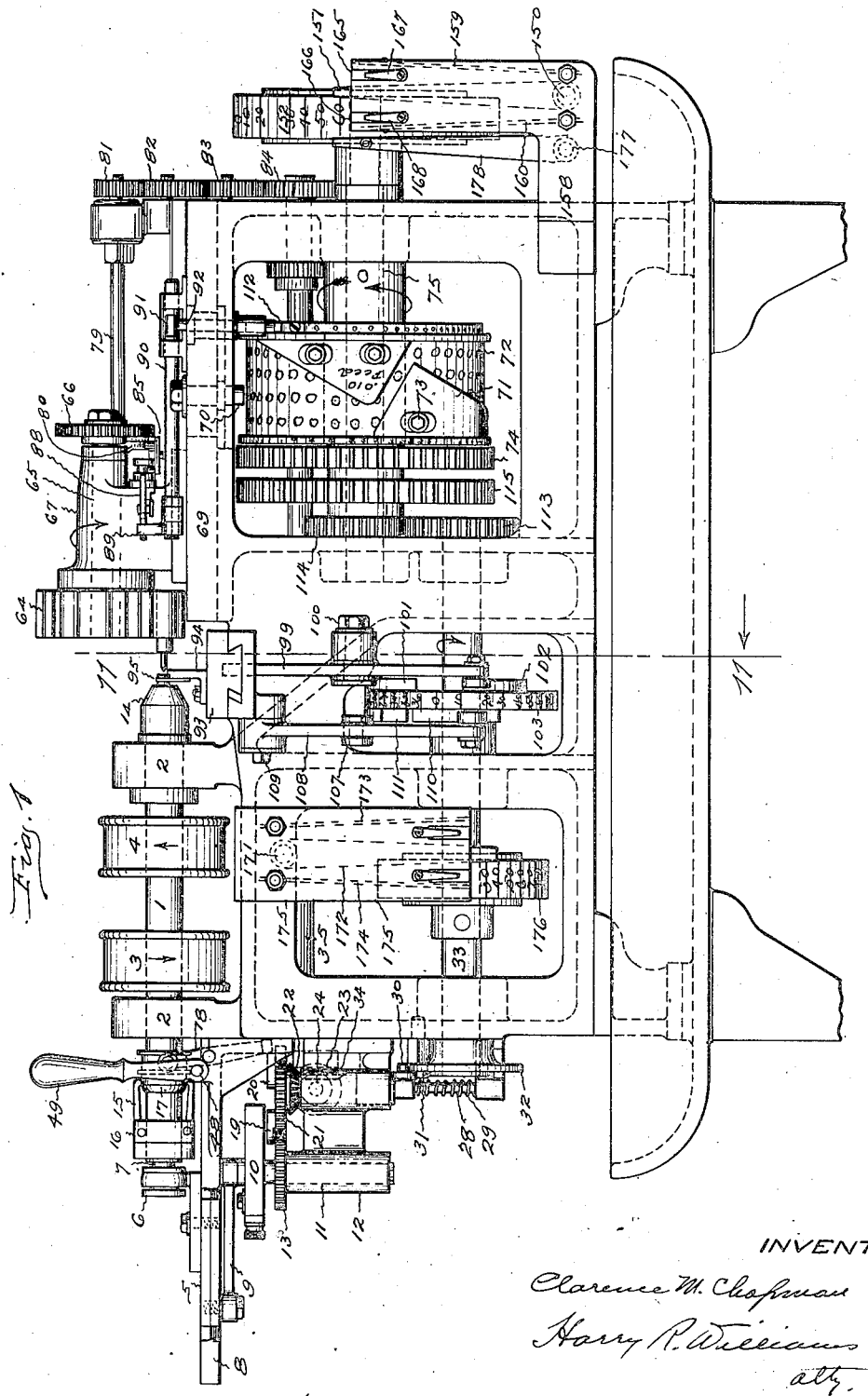
INVENTOR.
Clarence M. Chapman by
Harry P. Williams
atty.

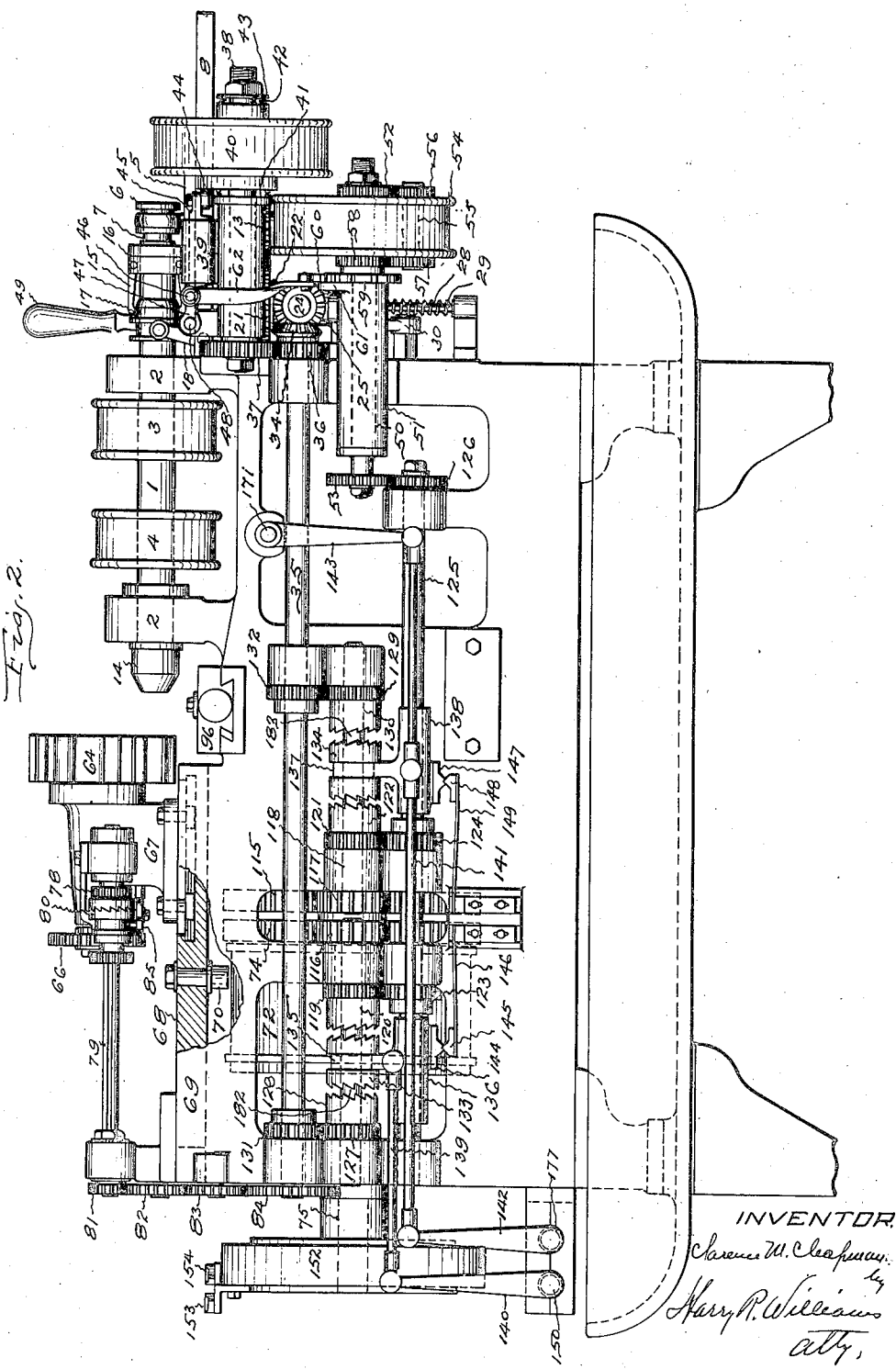

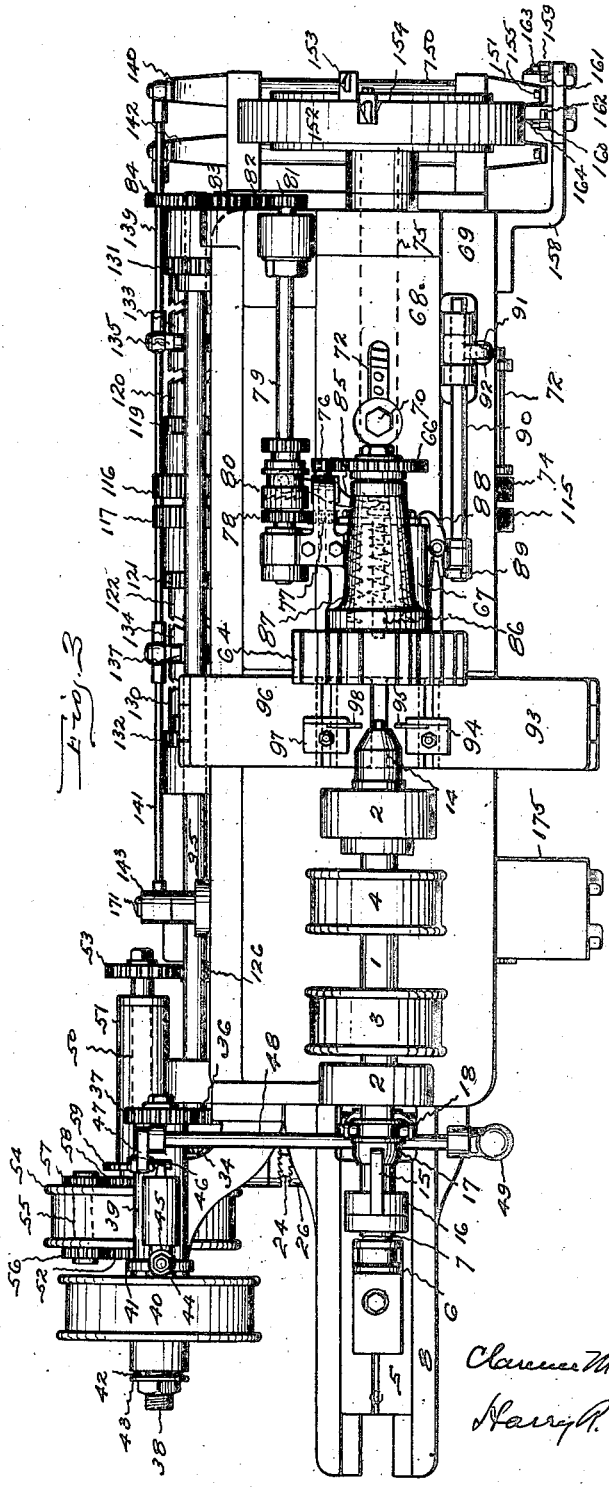

Feb. 19, 1924. 1,484,604
C. M. CHAPMAN
AUTOMATIC SCREW MACHINE
Filed Jan. 31, 1921 6 Sheets-Sheet 4
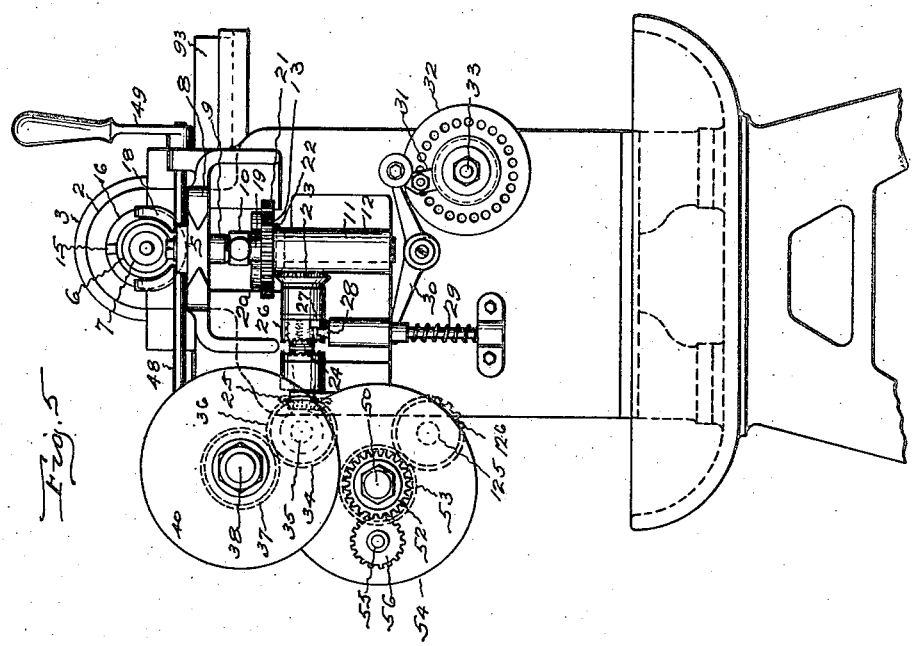
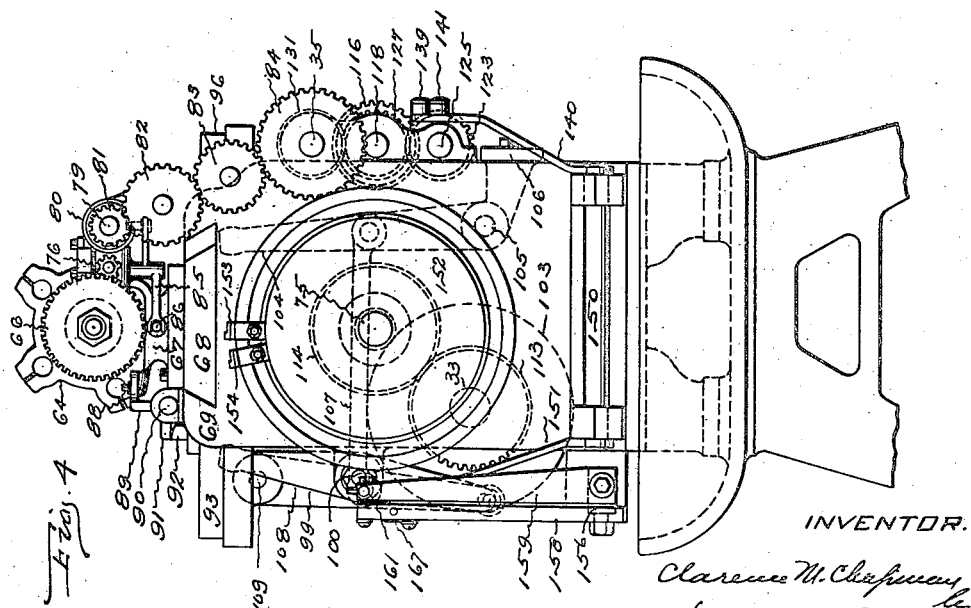
INVENTOR.
Clarence M. Chapman
by
Harry R. Williams
Atty.

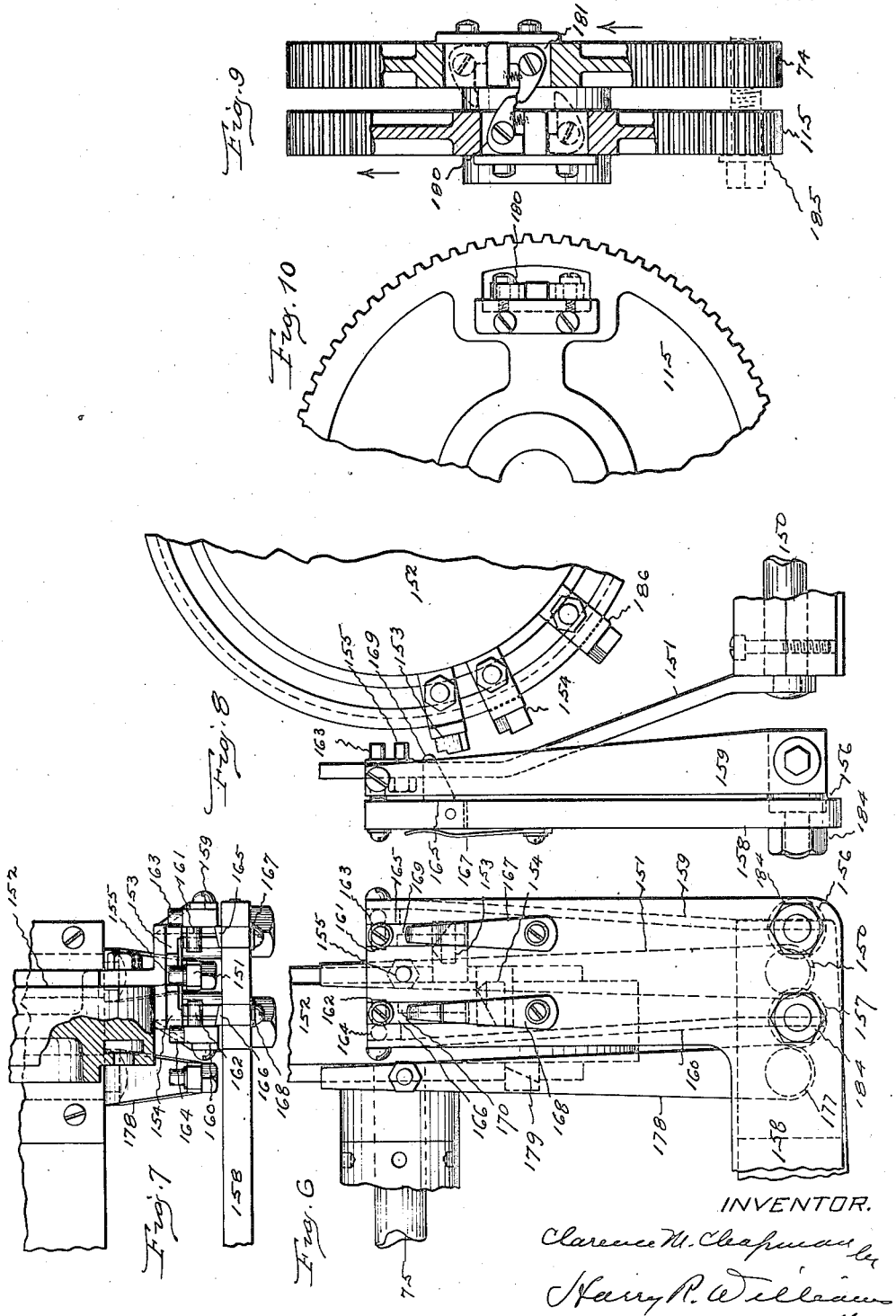

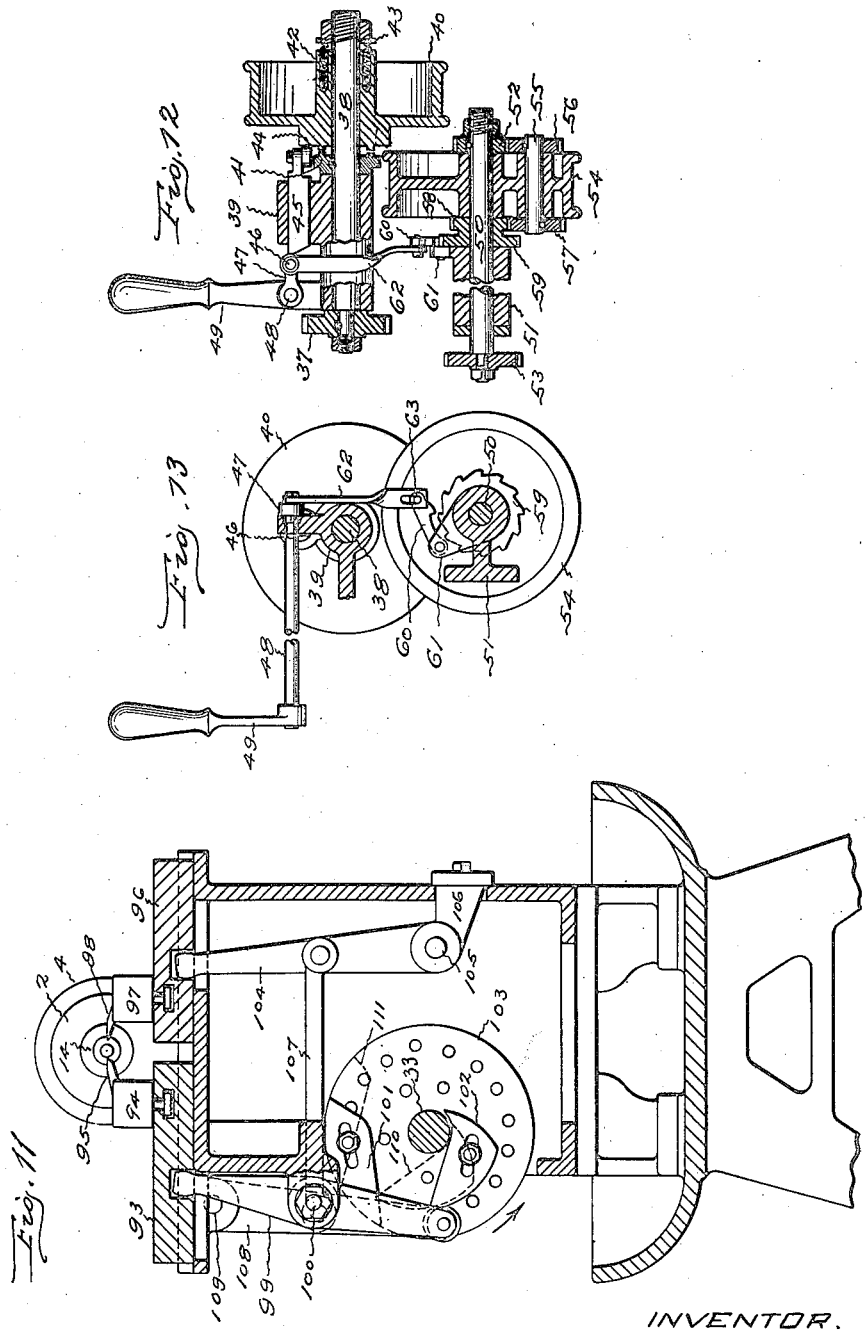

Patented Feb. 19, 1924.

1,484,604

UNITED STATES PATENT OFFICE.

CLARENCE M. CHAPMAN, OF PLYMOUTH, CONNECTICUT, ASSIGNOR TO THE CHAPMAN MACHINE COMPANY, OF PLYMOUTH, CONNECTICUT, A CORPORATION OF CONNECTICUT.

AUTOMATIC SCREW MACHINE.

Application filed January 31, 1921. Serial No. 441,144.

*To all whom it may concern:*

Be it known that I, CLARENCE M. CHAPMAN, a citizen of the United States, residing at Plymouth, in the county of Litchfield and State of Connecticut, have invented a new and useful Improvement in Automatic Screw Machines, of which the following is a specification.

This invention relates to the class of automatic lathes or screw machines in which stock in the form of wire, rods or tubes is continuously rotated and intermittently fed into position to be operated upon by tools which are mounted on a rotatory sliding turret and on reciprocatory cross slides that at predetermined intervals are advanced to bring the desired turning, forming and cutting-off tools up to the stock to be shaped.

Universal machines of this class, that is, machines capable of performing a great variety of work, must have a wide range of action, particularly the turret. The mechanism for controlling and operating the turret should provide sufficient range of action to enable one or a number of different operations of maximum length to be performed on stock of full diameter, which consume considerable time, also one or more various operations of minimum length on stock of small diameter, which require but a fraction of a second for the advance, dwell, return and indexing of the turret.

The object of the invention is to increase the production and provide for handling a greater variety of work as to size, length and shape, with fewer special appliances for affecting the necessary movements, and with no appreciable loss of time due to difference in length or diameter of the work, within reasonable limits, of machines of this class, which can only be accomplished by relatively simple and durable mechanisms having ideal motions made without shock or jar, and capable of diverse yet exact adjustments, which will operate at varying intervals and different distances accurately at high, low or differential speeds.

The object is attained in the machine illustrated as embodying the invention by providing among other features, an independent turret operating and controlling mechanism, capable of various speeds at different intervals and so adjustable that the turret tools can be made to perform a number of operations on a single piece or one operation on several pieces during each cycle; an independent cross-slides operating and controlling mechanism capable of various speeds at different intervals, with suitable connections for causing the turret mechanism and cross-slides mechanism to properly cooperate, whether one article or several articles are being completed during each cycle; means whereby the turret and cross-slides mechanisms may be correctly timed with relation to each other during each cycle; means which permit the turret and cross-slides mechanisms to be combined so that they will act as a unitary mechanism; a constant speed drive for all idle movements and a drive for working which runs in relation to the spindle speed but has provision for altering this speed; a system of separate cams for performing each function, which cams have a stated feed per revolution of the spindle, and means for altering the feed, as by change gears, without changing the cams; operating drums and control drums graduated and the sections numbered so that any motions and feeds may be accurately noted and recorded for repetition of work; a system of marking the cams so that the feed per revolution of the spindle may be known and recorded for future use; and means for operating the machine by hand when setting up and adjusting for the particular work, and for starting and stopping either or both the high and low speed mechanisms when the machine is set to operate automatically.

In the accompanying drawings Fig. 1 shows a front elevation of a machine which embodies the invention. Fig. 2 shows a rear elevation of the machine. Fig. 3 shows a plan of the machine. Fig. 4 shows an elevation looking toward the right-hand end of the machine. Fig. 5 shows an elevation looking toward the left-hand end of the machine. Fig. 6 shows on larger scale one of the control mechanisms. Fig. 7 is a plan of the parts shown in Fig. 6. Fig. 8 is a side view of the parts shown in Fig. 6. Fig. 9 shows a means for coordinating the cross-slides and turret mechanisms. Fig. 10 is a side view of the parts shown in Fig. 9. Fig. 11 is a vertical section of the machine on plane denoted by the dotted line 11—11 on Fig. 1 showing the cross-slides and their operating mechanisms. Fig. 12 shows the constantly driven high speed drive and the constantly driven low speed drive in section. Fig. 13 is a vertical section showing the starting and stopping handle lever and its connections with the high and low speed drives.

The machine illustrated is provided with a stock feeding mechanism similar to that shown and described in my co-pending application for patent for stock feeding mechanism, Serial No. 404,628, filed August 19, 1920. In this mechanism the stock is fed through the tubular spindle 1 which is supported by bearings 2 in the top of the frame and is continuously rotated in the desired direction by belts applied to the pulleys 3, 4.

The stock is advanced through the spindle at the required intervals by a slide 5 which has a part engaging a spool 6 on the end of the feed quill 7 and is mounted on the bracket 8 fastened to the end of the frame. The slide is reciprocated by a link 9 connected with a crank bar 10 that is fastened to the upper end of a vertical shaft 11 which is supported by the bracket 12. Secured to this shaft below the crank bar is a gear 13, Fig. 1. The stock is gripped in the chuck 14 when rotated and released when fed, by the action on the clutch of the lever fingers 15 pivotally mounted on the collar 16 secured to the spindle, as these fingers are actuated by the conical wedge 17 that is slidable on the spindle. The wedge is reciprocated by a lever 18 that is oscillated at the proper times by cams 19 and 20 secured on the gear 21 that meshes with the gear 13, Fig. 1. The gear 21 is fastened to a beveled gear 22 that is engaged by the beveled gear 23 on the tubular horizontal shaft 24 into which loosely extends the arbor of a beveled gear 25, Fig. 5. The gear 25 has a clutch member and is normally connected with the shaft 24 by the spring clutch member 26 that is slidable upon the shaft 24 but turns therewith. The clutch member 26 bears a cam 27 that engages with a pin 28 for releasing the clutch. This pin is normally held in position to engage the cam by a spring 29 and is withdrawn from engaging position by the lever 30 that is oscillated by one or more trip dogs 31 fastened in the required locations on the disc 32 that is secured to the end of the cross-slides operating disc shaft 33, Fig. 5. All of these mechanisms and their co-action are fully illustrated and described in the above noted application to which reference is made for further details of construction.

The beveled gear 25 which is designed to be clutched to the horizontal shaft 24 is engaged by a beveled gear 34 that is secured to the end of the high speed drive shaft 35 which extends along the back of the machine. The high speed drive shaft 35 has a spur gear 36 that is engaged by spur gear 37 on the high speed pulley shaft 38 which is supported horizontally by a bracket 39. Loose on the high speed pulley shaft is a driving pulley 40 that is rotated continuously at constant speed, Fig. 12. This pulley is slidable on the shaft and is normally thrust inward so that it will engage with the clutch 41 which is secured to the shaft, by springs 42 located in hub of the pulley and thrusting against a washer 43 secured to the end of the shaft. The pulley is adapted to be pushed along the shaft against the thrust of the springs to disengage it from the clutch by a roll 44 mounted on the end of a sliding bar 45 which is supported in a part of the bracket 39, Fig. 12. This bar has a beveled end which is engaged by a stud 46 projecting from the arm 47 attached to the rear end of a rock shaft 48 that extends across the machine and at the front has a handle 49, Figs. 3 and 12. When the handle is turned one way the pulley is disengaged from the clutch so that it does not rotate the high speed pulley shaft. When the handle is turned the other way the pulley is connected with the shaft so as to drive the mechanisms for opening the chuck, feeding the stock the necessary distance, and closing the chuck so that the stock is firmly gripped and rotated with the spindle. This also causes the rotation of the high speed drive shaft 35 and drives the mechanisms connected therewith.

The low speed pulley shaft 50 is mounted in a bracket 51 at the rear of the machine. Secured to the outer end of this shaft is a gear 52 and secured to the inner end is a gear 53, Fig. 2. The driving pulley 54 turns loosely on the shaft and carries an arbor 55 with a gear 56 that meshes with the gear 52 fixed to the shaft outside of the pulley and a gear 57 that meshes with a gear 58 which is loose on the shaft inside the pulley. The gear 58 is secured to a ratchet 59 which is adapted to be engaged and held from rotation by a pawl 60 pivoted to an arm 61 that projects from the outer end of the bracket 51, Figs. 12 and 13. There is but one or two teeth difference between the gears 52 and 58, so that when the latter is held and the pulley is rotated the shaft will be driven by this differential gearing at a very slow speed. When the pawl is lifted out of engagement with the ratchet the gear 58 turns freely and the shaft 50 is not rotated. The pawl is connected by a link 62 with the rocker arm 47 on the handle shaft 48 so that the engagement and disengagement of the pawl with the ratchet depends upon the position of the handle. The lower end of the link is slotted and a pin 63 projects from the pawl into the slot. With this construction if the handle is pushed part way either the high speed mechanism or the low speed mechanism can be set in operation or stopped without setting in operation or stopping the other mechanism. When the handle is pushed the full distance both mechanisms can be started or stopped, depending upon the direction in which the handle is turned. This provides a very convenient means for starting or stopping at will either mechanism, which is very serviceable when setting up the machine or when making adjustments.

The tool holding turret 64 which is illustrated is of the type shown and described in my co-pending application for patent for turret mechanism, Serial No. 409820, filed September 13, 1920. The turret is secured to one end of the shaft 65, to other end of which a gear 66 is fastened, Fig. 1. The turret shaft is rotatably mounted in a head 67 that is adjustably fastened to the top of a slide 68 which is designed to be moved back and forth in ways along the top of the frame 69, Figs. 2, 4. The slide has a roll-stud 70 extending downward into the path of the cams 71 that have the required pitch and are secured in the necessary locations on the cam drum 72 to impart the desired forward and return movements to the turret, Figs. 1, 2. The cams are secured to the periphery of the drum by studs 73 which pass through slots in the cams into threaded holes in the drum, there being a large number of these holes in the drum so that the positions of the cams may be varied. In practice the cams are marked to indicate the ratio of feed to the spindle rotation and one edge of the drum is graduated and numbered so that with a proper record any desired work may be accomplished or the machine can be quickly set up for the duplication of any work previously done, Fig. 1. Fastened to the side of the cam drum is a gear 74, the drum and gear being fixed on the turret operating drum shaft 75. This turret feeding mechanism is similar to that shown in the above mentioned application.

The gear 66 on the turret shaft is engaged by a pinion 76 on a shaft that has a gear 77 engaged by a gear 78, Figs. 3, 4. The gear 78 is connected to a shaft 79 by a clutch 80 for rotating the turret. On the end of the shaft 79 is a gear 81 that by intermediate gears 82 and 83 is driven by a gear 84 on the high speed drive shaft 35 which is driven from the high speed drive pulley 40, Fig. 2.

The clutch 80 is engaged for causing the high speed mechanism to rotate the turret by the lever 85, which is connected with the index locking bolt 86 that is actuated by the springs 87 in the turret head. The spring tension is controlled by the latch 88 which when released allows the bolt to withdraw and the clutch to engage, Fig. 3. The latch 88 is released by the rocker 89 on the rock shaft 90 that has a lug 91 which is engaged by a plunger 92 that is lifted at the proper times by one or more dogs 112 adjustably attached to the edge of the cam drum, Figs. 1, 3. This mechanism for engaging and disengaging the clutch and actuating the index locking bolt is the same as that shown and described in the above noted application for turret mechanism and reference is made to that application for a more detailed description of the parts and the manner of their co-operation.

The front cross slide 93 which ordinarily is provided with an adjustably secured tool holder 94 carrying a forming tool 95, and the rear cross slide 96, which is usually provided with an adjustable tool holder 97 carrying a cut-off tool 98, are arranged to be fed back and forth in ways on the top of the frame between the turret and the chuck, Figs. 1, 3. The front slide is reciprocated by a lever 99 pivoted on a stud 100 and adapted to be oscillated by cams 101 and 102 adjustably fastened to one face of the disc 103 that is secured to the cross slides operating disc shaft 33. The rear slide is reciprocated by a lever 104 pivoted on the stud 105 held by a bracket 106 bolted to the rear wall of the frame. The lever 104 is connected by a link 107 with a lever 108 that is hinged near the top at the front of the frame on the stud 109 and is oscillated by cams 110 and 111 on the other face of the disc 103, Figs. 1, 11. Fixed on one end of the cross slides operating disc shaft 33 is a gear 113 that meshes with the gear 114 which is connected with the gear 115, these gears 114 and 115 turning freely on the turret operating drum shaft at the side of the gear 74, Fig. 1.

Meshing with the drum gear 74 is the gear 116 and meshing with the cross slides gear 115 is a gear 117. At the back of the machine is the clutch shaft 118 which is divided or made in two sections, 182 and 183, Fig. 2. The gear 116 is fixed to the section 182 and the gear 117 is fixed to the section 183 of the clutch shaft. Loose on the section 182 is a gear 119 and a clutch member 120 and loose on the section 183 is a gear 121 and a clutch member 122. The gear 119 is engaged by a gear 123 and the gear 121 is engaged by a gear 124, which gears 123 and 124 are fastened to the low speed drive shaft that is supported by suitable bearings at the rear of the machine and has a gear 126 meshing with the gear 53 on the low speed pulley shaft 50, Fig. 2. Also, loose on the clutch shaft section 182 is a gear 127 and clutch member 128, and loose on the clutch shaft section 183 is a gear 129 and clutch member 130. The gear 127 is engaged by a gear 131 and the gear 129 is engaged by a gear 132, which gears 131 and 132 are fastened to the high speed drive shaft 35. Longitudinally movable along but rotatably connected with the clutch shaft section 182 between the clutch members 120 and 128 is a double clutch member 133, and slidable on the section 183 between the clutch members 122 and 130 is a double clutch member 134, Fig. 2. The clutch member 133 is adapted to be slid back and forth along the shaft section 182 by an arm 135 projecting from a sleeve 136 slidable along the shaft 125 and the clutch member 134 is adapted to be slid along the shaft section 183 by an arm 137 projecting from the sleeve 138 slidable along the shaft 125. The sleeve 136 is connected by a rod 139 with a control arm 140 and the sleeve 138 is connected by a rod 141 with a control arm 142 at one end and with a control arm 143 at the other end, Fig. 2. Attached to the sleeve 136 is a shoe 144 having sloping sides and a central notch, and engaging with this shoe is a wedge 145 on the end of a spring finger 146. Attached to the sleeve 138 is a similar shoe 147 engaged by a wedge 148 on the end of a spring finger 149, the fingers being fastened to the frame of the machine. When the movable clutch members are in neutral position the wedges rest in the notches in the shoes so as to retain the clutch members. When a clutch member is slid into engagement with its complementary members in either direction the wedge rides out of the notch and slides down the inclined face of the shoe and insures the engagement of the clutch members. With the clutch member 133 engaged with the clutch member 128 the drum with the cams which effect the turret movements is rotated at high speed from the shaft 35. With the clutch member 133 engaged with the clutch member 120 the turret cam drum is rotated at low speed from the shaft 125. If the clutch member 134 is engaged with the clutch member 130 the cross slides mechanism is operated at high speed, and if the clutch member 134 is engaged with the clutch member 122 the cross slides mechanism is operated at low speed. By this mechanism the turret can be operated at high or low speed and the cross slides can be operated at high or low speed, and the mechanism for actuating these are independent of each other so that the relative speeds and intervals of the different speeds may be altered to suit the particular work to be accomplished. The gears 113 and 114 are shown as of the same pitch, the ratio, however, may be changed to two to one, or three to one if it is desired to have the cross-slides mechanism make two or three cycles to one of the turret operating mechanism.

The mechanisms for controlling the engagement of the several clutches and changing the speeds of the turret and cross slides are substantially similar, the turret control mechanism being located at the right hand end of the machine and the cross slides control being located at the left of the center of the machine.

The arm 140 is secured to the rear end of an arbor 150 that extends across the machine and at the front has an arm 151, Fig. 4. The arm 151 stands up adjacent to the edge of the turret control disc 152. One or more cam dogs 153 and 154 with inclined sides are secured to the face of the disc in such manner that their positions may be changed as desired, Fig. 8. These dogs are spaced apart longitudinally of the axis of rotation such a distance that when the arm 151 is vertical and the turret control clutch member 133 is in neutral position the dogs will pass one on each side of a stud 155 that projects from the arm 151, Fig. 6. With their lower ends secured to circular hubs 156 and 157 that are held by nuts 184 in sockets in the lower part of the bracket 158 which is secured to the front of the frame at the right hand end, are two spring fingers 159 and 160. These fingers extend upwardly one on each side of the arm 151 and are at their upper ends provided with studs 161 and 162 adapted to engage the edges of the arm 151, Fig. 7. These spring fingers have also studs 163 and 164 which are designed to be engaged by the dogs 153 and 154, Figs. 7, 8. Pivotally held in slots in the upper portion of the bracket are two latches 165 and 166. These latches are normally pressed inward by springs 167 and 168 and they have tongues 169 and 170 which are designed to be engaged by the dogs 153 and 154, Figs. 6, 7.

The dog 153 is designed to engage the stud 163 and push the spring finger 159 outward until the latch 165 engages and holds the finger with the spring under tension, while the dog 154 is designed to engage the stud 164 and push the spring finger 160 outward until the latch 166 engages and holds the finger with the spring under tension, Fig. 7. The tension of these spring fingers may be adjusted at any time by loosening the nuts 184 and turning the hubs of the fingers in the sockets they occupy. During the rotation of the disc one section of one of the dogs engages the stud 155 on the arm 151 and starts to push the arm over. At practically the same time another section of the dog engages a tongue and pushes a latch outward so as to release one of the spring fingers allowing that finger to spring in so as to strike and quickly throw the arm 151 way over. This shifts the turret control clutch 133 in one direction. After the finger has thrown the arm the continued movement of the dog that released the latch brings a section of the dog into engagement with the stud carried by the finger that was released and pushes it back until it is again engaged by the latch and held under tension. The arm remains over in the position to which it was thrown until the following dog engages the stud on the arm and starts it and then pushes in the other latch and releases the finger on that side, allowing it to spring forward and throw the arm back to the first position and shift the clutch back. Any number of these dogs for shifting the movable member of the turret control clutch can be secured to the disc and these can be located in the required positions to effect the times of change and intervals of duration of the different speeds necessary for the desired operations on the work to be done by the turret tools.

When it is desired to have either operating mechanism stop a dog 186 that will not trip a latch is attached to the cam disc 152. The control for shifting the movable member of the cross slides clutch 134 is similar to that already described for shifting the movable member of the turret clutch. The arm 143 that is connected with the rod 141 for shifting the clutch member 134 is fastened to an arbor 171, Fig. 2. This arbor extends across the machine and on the front end carries an arm 172 which is designed to be thrown back and forth by spring fingers 173 and 174 that are fastened to the bracket 175 and project downward into path of dogs on the disc 176 which is fastened to the shaft 33, Fig. 1. The number of dogs that are attached to the disc 176 may be varied and their position and relation may be such as is necessary to cause the cross slides speeds to change for the purpose of performing the desired work. The rod 141 which operates the cross slides member 134, as stated, is also connected with the arm 142 at the end of the machine, Fig. 2. This arm is connected with an arbor 177 that extends across the machine and on the front has an arm 178 that can be operated by one or more dogs 179 which may be attached to the turret control disc 152, Fig. 6.

A timing device may be arranged between the turret drum gear 74 and the cross slides gear 115 that are arranged side by side on the drum shaft 75, to prevent the turret and cross slides mechanisms from creeping out of time due to slight error or variations in the mechanical operations of shifting the clutches. To accomplish this a spring latch 180 facing in one direction may be pivoted in an opening in the gear 115 and a latch 181 facing in the opposite direction can be pivoted in an opening in the gear 74. The relation of the latches when it is desired to have the gear 74 pick up the gear 115 is shown in full lines in Fig. 9. When it is desired to have the gear 115 pick up the gear 74 the latches are reversed as shown in dotted lines in Fig. 9. These latches are pivotally mounted in openings in the gears and are employed when the conditions are such that it is desired to drive one gear from the other or if one mechanism is inclined to creep ahead of the other and cause a tool to operate at the wrong time.

When the hand starting lever is pushed over and the high speed drive pulley and low speed drive pulley are actively connected, the stock feeding mechanism is operated by the trip dogs on the disc at the end of the cross slides shaft to open the chuck, feed the stock and close the chuck so that the stock will rotate with the spindle. The forming and turret tools advance at high speed until nearly in contact with the work when the control dogs trip the latches and cause the clutches to be thrown for changing the speed to a proper cutting feed for the particular cuts to be made. The machine continues to operate on the slow cutting speed until the forming operations are completed, then the clutches are shifted and the tools withdrawn at high speed. If the forming tool cut is the long operation and the turret tool cuts are short, or if there are two or more turret operations while the forming tool is completing its operation the turret operating mechanism is driven by the cross slides operating mechanism through the intermediate drive latches located on the two gears at the side of the cam drum. If it is desired to connect the turret and cross slides mechanism so they operate as a unit the two gears may be secured together, as by a bolt 185, Fig. 9. After the first turret operation is finished the turret operating drum is turned at high speed to bring the next turret tool to the work, then the turret operating drum control dog trips the turret driving clutch into slow or cutting speed to complete the second cut. This may be done without interfering with the forming tool mechanism. After the turret operations are completed the turret mechanism intermediate drive latch passes by the cross slides intermediate drive latch until stopped by the control dog. It then dwells until the cross slides intermediate drive latch comes up to and drives the turret operating mechanism. Many combinations can be made through the intermediate drive latches as these latches can be placed in such a position that either will pass by the other and then be driven by the latch that was passed. On certain classes of work and when all operations are brief and only one-half or one-third the operating cam surface is required to complete the article the machine may be doubled or tripled cammed, thus making two or three complete articles to one cycle of the turret or cross slides operating mechanisms. The driving shafts are all run at constant speed and may be run in a definite relation to the spindle speed but by changing the gears of the low speed drive the ratio between the low speed and high speed can be altered when desired. As the turret operating mechanism and its control are normally independent of the cross slides mechanism and its control, and the controls are independently adjustable, practically every possible combination of movements or rations of speed and duration of running of the mechanism at the different speeds that is necessary to do any kind of work may be obtained with this mechanism.

The invention claimed is:—

1. A machine of the character described having a reciprocatory turret, mechanism for reciprocating the turret, a reciprocatory cross slide, mechanism for reciprocating the cross slide, a constant high speed drive mechanism, an adjustable low speed drive mechanism, means for alternately connecting the high and low speed drive mechanism with said turret operating mechanism, and means for alternately connecting the high and low speed drive mechanisms with said cross slide operating mechanism, said latter means being operable independently from said former means.

2. A machine of the character described having a reciprocatory turret, mechanism for reciprocating the turret, a reciprocatory cross slide, mechanism for reciprocating the cross slide, a constant high speed drive mechanism, an adjustable low speed drive mechanism, means for alternately connecting the high and low speed drive mechanisms with said turret operating mechanism, an adjustable control mechanism for shifting said connecting means so the turret operating mechanism may be intermittently driven fast and slow, and means for alternately connecting the high and low speed drive mechanisms with said cross slide operating mechanism, said latter means being operable independently from said former means.

3. A machine of the character described having a reciprocatory turret, mechanism for reciprocating the turret, a reciprocatory cross slide, mechanism for reciprocating the cross slide, a constant high speed drive mechanism, an adjustable low speed drive mechanism, means for alternately connecting the high and low speed drive mechanisms with said turret operating mechanism, means for alternately connecting the high and low speed drive mechanisms with said cross slide operating mechanism, and an adjustable control mechanism for shifting said connecting means so the cross slide operating mechanism may be intermittently driven fast and slow independently of the turret mechanism.

4. A machine of the character described having a reciprocatory turret, mechanism for reciprocating the turret, a reciprocatory cross slide, mechanism for reciprocating the cross slide, a high speed drive mechanism, a low speed drive mechanism, means for connecting the high and low speed drive mechanisms with said turret operating mechanism, means for connecting the high and low speed drive mechanisms with said cross slide operating mechanism, and two adjustable control mechanisms independent of each other for shifting said connecting means so that the turret operating mechanism may be intermittently driven fast and slow and so that the cross slide operating mechanism may be intermittently driven fast and slow.

5. A machine of the character described having a reciprocatory turret, mechanism for reciprocating the turret, a reciprocatory cross slide, mechanism for reciprocating the cross slide, a constant high speed drive mechanism, an adjustable low speed drive mechanism including differential gears and change gears between the differential gears and the low speed driven shaft, said drive mechanisms being independent of each other, and shiftable means for connecting either the high speed drive mechanism with the turret operating mechanism or the low speed drive mechanism with said turret operating mechanism.

6. A machine of the character described having a reciprocatory turret, mechanism for reciprocating the turret, a reciprocatory cross slide, mechanism for reciprocating the cross slide, a constant high speed drive mechanism, an adjustable low speed drive mechanism, said drive mechanisms being independent of each other, and means for connecting the high and low speed drive mechanisms with said cross slide operating mechanism.

7. A machine of the character described having stock feeding mechanism, a cross slide, mechanism for reciprocating the cross slide, a turret, mechanisms for rotating and reciprocating the turret, and mechanism for controlling the reciprocation of the turret, said turret reciprocating and controlling mechanisms being operable independently of the operation of the other of said mechanisms.

8. A machine of the character described having stock feeding and rotating mechanisms, a reciprocatory and rotatable turret, and high and low speed mechanisms operable independent of all other operating mechanisms for reciprocating and controlling the reciprocation of the turret whereby the speed of the turret operating mechanism relative to the speeds of all other mechanisms may be altered without affecting the speeds of such other mechanisms.

9. A machine of the character described having a reciprocatory and rotatable turret and high and low speed mechanisms operable independently of all the other operating mechanisms, for reciprocating the turret, said turret reciprocating mechanism comprising a shaft, a cam drum fixed on the shaft and cams adjustably secured to said drum for causing the reciprocation of the turret whereby the speed of the turret operating mechanism relative to the speeds of all other mechanisms may be altered without affecting the speeds of such other mechanisms.

10. A machine of the character described having a reciprocatory turret, mechanism operable independently of all other operating mechanisms, for reciprocating the turret, means for operating said mechanism at a constant speed and means including change gears for operating said mechanism at another speed, whereby said other speed may be altered relatively to the constant speed according to the work to be done without affecting the speeds of all other mechanisms.

11. A machine of the character described having a reciprocatory and rotatable turret and mechanism operable and controllable independently of all the other operating mechanisms for reciprocating and controlling the reciprocation of the turret, said turret reciprocating mechanism comprising a shaft, a control disc fixed on the shaft, a cam drum fixed on the shaft, and cams adjustably secured to said drum for causing the reciprocation of the turret.

12. A machine of the character described having a reciprocatory turret, mechanism operable independently of all other mechanisms for reciprocating the turret, said mechanism comprising a constant speed drive mechanism, a low speed drive mechanism, means for connecting the high and low speed drive mechanisms with said turret operating mechanism, and an adjustable control mechanism for shifting said connecting means at any predetermined period of a cycle.

13. A machine of the character described having a reciprocatory and rotatory turret and mechanism for operating the turret, reciprocatory cross slides and mechanism for reciprocating the cross slides operable independently of the turret operating mechanism, said mechanism comprising a rotatable shaft, a disc mounted on the shaft, cams adjustably secured to the disc, and levers intermediate the cams and slides.

14. A machine of the character described having cross slides and independent mechanism for operating the cross slides, said mechanism comprising rotatable cams, means for rotating the cams at one speed and means for rotating the cams at a different speed, said latter means including alterable change gears whereby the relations of the speeds may be varied according to the work to be done.

15. A machine of the character described having stock feeding and rotating mechanisms, cross slides and mechanism independent of the stock feeding and rotating mechanisms for operating the cross slides, said mechanism comprising a shaft, a disc on the shaft, cams adjustably secured to the disc, connections between the cams and slides, mechanism for rotating the shaft at two different speeds, and a control disc on the shaft and provided with means for shifting from either speed to the other during any period of a cycle without affecting the speed of the stock operating mechanisms.

16. A machine of the character described having stock feeding and rotating mechanisms an independent cross slide operating and controlling mechanism, a constant speed drive and an adjustable speed drive for said mechanism, and means for shifting from one drive to another at any period of a cycle without affecting the speed of the stock operating mechanisms.

17. A machine of the character described having an independent turret operating mechanism, an independent cross slides operating mechanism, a high speed drive, a low speed drive, and means for connecting both of said operating mechanisms with both of said drives.

18. A machine of the character described having stock feeding and rotating mechanisms, a turret, a cross slide, independent mechanisms for operating the turret and slide, and controlling mechanism for changing the speed of operation of the turret and slide at any portion of a cycle without affecting the speed of the stock operating mechanisms.

19. A machine of the character described having a two speed drive with a clutch for connecting and disconnecting either drive, and a controlling mechanism for operating the clutch, said controlling mechanism comprising means operatively connected with the drive for positively disengaging the clutch, and a spring lever for engaging the clutch, said lever being placed under tension and released by means operatively connected with the drive.

20. A machine of the character described having a two speed drive with a clutch for connecting and disconnecting either drive, and a controlling mechanism for operating the clutch, said controlling mechanism comprising a drum with adjustable wedge shaped dogs for causing the control to place the clutch in neutral position and a spring lever for causing the control to engage the clutch.

21. A machine of the character described having a two speed drive with a clutch for connecting and disconnecting either drive, and adjustable mechanism for controlling the operation of the clutch, said control being capable of disconnecting, holding in neutral position and engaging the clutch at any predetermined intervals during the cycle of operations.

22. A machine of the character described having a two speed drive with a clutch for connecting and disconnecting either drive, and means for holding the clutch in neutral position or on either side of neutral position during any portion of the cycle of the machine.

23. A machine of the character described having a two speed drive, a clutch for connecting and disconnecting either drive, a slide for shifting the clutch, said slide having a V-shape notch and inclined surfaces each side of the notch, and a spring finger with a V-shape wedge adapted to enter said notch or ride on the inclined surfaces at the sides of the notch, for retaining the slide in the position to which it is moved.

24. A machine of the character described having a turret and cross slide with mechanisms for operating them, an independent mechanism for controlling the operation of said turret mechanism, an independent mechanism for controlling the operation of said cross slide mechanism, and an operative connection between said controls whereby either may control the operation of both the turret and cross slide mechanisms.

25. A machine of the character described having a turret and cross slide, mechanisms for operating the turret and cross slide independently, and means for connecting said independent turret mechanism and said independent cross slide mechanism whereby the cross slide mechanism may be driven for any portion of a cycle from the turret mechanism.

26. A machine of the character described having a turret and cross slide, mechanisms for operating the turret and cross slide independently, and means for connecting said independent turret mechanism and said independent cross slide mechanism whereby the turret mechanism may be driven for a portion of a cycle from the cross slide mechanism.

27. A machine of the character described having a turret and cross slide, mechanisms for operating the turret and cross slide independently, and trip latches arranged between said turret and cross slide operating mechanisms which permit either mechanism to be operated from the other.

28. A machine of the character described having a turret and cross slide, turret operating and control mechanism, cross slide operating and control mechanism, and means arranged between the two mechanisms for adjusting the two units in time during each cycle.

29. A machine of the character described having a turret and cross slide, turret operating and control mechanism, cross slide operating and control mechanism, and means whereby the two mechanisms may be locked together to operate as a unitary mechanism.

30. A machine of the character described having a turret and cross slide, a rotatable turret operating mechanism, a rotatable cross slide operating mechanism, means for rotating the two operating mechanisms at the same relative speed, and means whereby the cross slide operating mechanism may be rotated two or more cycles to one cycle of the turret operating mechanism.

31. A machine of the character described having a rotatable and reciprocatory turret, a rotatable drum, cams adjustably secured to the drum, a roll and post projecting from the turret into the path of the cams, and means movably securing the post to the turret in order that the roll and post may be adjusted to compensate for the height of the cams being used on the drum.

32. A machine of the character described having two independent driving systems operable at different speeds, and an operating lever for starting and stopping both driving systems, said lever being connected so as to stop either system and operate the other while the one is stopped.

33. A machine of the character described having a turret and cross slide, mechanisms for operating the turret and cross slide, and unitary mechanism for controlling the speed of the turret and cross slide operating mechanisms, said controlling mechanism comprising a drum having T-slots in its face near the periphery, doubled faced trip dogs adapted to change the speed of the turret operating mechanism and double faced trip dogs adapted to change the speed of the cross slide operating mechanism, arranged on the periphery of the drum, bolts passing through said dogs into said slots, and means for rotating said drum.

34. A machine of the character described having a two speed drive with means for connecting and disconnecting either drive, means for shifting said connecting means, an arm for actuating said shifting means, spring levers for swinging said arm, latches for retaining said levers, a control disc and trip dogs adjustably secured to said disc, for first tripping the latches and releasing said levers and allowing the levers to throw the arm, and then returning the levers to latched position.

35. A machine of the character described having a turret and cross slide, mechanisms for actuating the turret and cross slide, and two independent drives with means for connecting either drive with the turret and cross slide mechanisms, one of said drives including a differential gear for reducing its speed.

36. A machine of the character described having a turret and cross slide, mechanisms for actuating the turret and cross slide, a high speed drive with means for connecting the high speed drive with the turret and cross slide mechanisms and a low speed drive which includes a differential gearing and change gears for altering the relation of the speed of the drive to the rotation of the spindle, with means for connecting said low speed drive with the turret and cross slide mechanisms.

37. A machine of the character described having a rotatable and reciprocatory turret, means including a rotatable drum for reciprocating the turret, and cams adjustably secured to the drum, said drum having its surface divided by lines into equally spaced and numbered sections so that the exact location of the cams may be noted and recorded, permitting replacement in exact location for reproducing required movements.

38. A machine of the character described having a two speed drive with a clutch for connecting and disconnecting either drive means for shifting said clutch, comprising an arm for actuating said shifting means, spring levers adapted to engage said arm, latches for retaining said levers under tension, a control disc and trip dogs adjustably secured to said disc, said dogs releasing said levers from the latches and causing the arm to release the clutch and allowing the levers to throw the arm and then returning the levers to latched position.

39. A machine of the character described having a reciprocatory turret, mechanism for reciprocating the turret, a reciprocatory cross slide, mechanism for reciprocating the cross slide, a high speed drive shaft, a low speed drive shaft, a divided intermediate shaft, gears on each section of the intermediate shaft meshing with gears on the high and low speed shafts, also with gears on the turret and cross slide shafts, clutches on both section of the intermediate shaft and adapted to connect the several gears thereon with the shaft, a control connected with the turret mechanism shaft for shifting a clutch on one section of the intermediate shaft, and a control connecting with the cross slide mechanism for shifting a clutch on the other section of the intermediate shaft.

40. A machine of the character described having a high speed drive shaft, a low speed drive shaft, a divided intermediate shaft, gears loose on each section of the intermediate shaft and meshing with gears fixed on the high and low speed shafts, gears fixed on each section of the intermediate shaft, clutches on both sections of the intermediate shaft and adapted to connect the several loose gears thereon with the shaft, a control for shifting a clutch on one section of the divided shaft and an independent control for shifting the clutch on the other section of the divided shaft.

41. A machine of the character described having independent turret and cross slides operating mechanisms, high and low speed drive mechanisms adapted to be independently connected with the turret and cross slides operating mechanisms, and means for connecting the turret and cross slides operating mechanisms so they will operate as a unit mechanism.

42. A machine of the character described having independent turret and cross slides operating mechanisms, high and low speed drive mechanisms, independent clutches adapted to connect said drive mechanisms with said operating mechanisms, means including an arm and spring fingers for shifting said clutches, a disc bearing dogs for actuating said shifting means, said dogs being shaped to positively start said shifting means and release the spring fingers for continuing the action of said shifting means and finally returning said spring fingers to normal position.

43. A machine of the character described having high and low speed drive mechanisms, a clutch for operatively connecting said mechanisms, an arm for shifting said clutch, spring fingers for throwing said arm back and forth, latches for retaining said fingers under tension, a control disc and dogs secured to the disc for moving said arm, releasing the fingers from the latches and returning the fingers to latched position after they have been released and performed their functions.

44. A machine of the character described having turret and cross slides operating mechanisms, high and low speed drive mechanisms, and means for connecting said driving mechanisms with said operating mechanisms, said means including a pivoted arm, and spring fingers for swinging said arm, said fingers being attached to cylindrical hubs adjustably held by bolts in cylindrical sockets in a bracket secured to the machine frame.

45. A machine of the character described having a turret operating mechanism comprising a shaft and attached gear, cam drums and control disc, a cross slides operating mechanism comprising a shaft and attached gear, cam disc and control disc, and a pair of connected gears turning loose on the cam drum shaft, one of said gears being adjacent to the gear on the drum shaft and the other meshing with the gear on the cross slides cam shaft.

CLARENCE M. CHAPMAN.